United States Patent
Yan et al.

(10) Patent No.: US 7,535,190 B2
(45) Date of Patent: May 19, 2009

(54) SYSTEM AND METHOD FOR CONTROLLING A WINDOW WIPER SYSTEM

(75) Inventors: Zhang Yan, Northville, MI (US); Amer Malik, Shelby Township, MI (US); Zhengyu Dai, Canton, MI (US); Issa Aljanabi, Windsor, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 11/742,087

(22) Filed: Apr. 30, 2007

(65) Prior Publication Data

US 2008/0263807 A1 Oct. 30, 2008

(51) Int. Cl.
*H02P 1/04* (2006.01)
(52) U.S. Cl. .................. 318/443; 318/444; 318/282; 318/268; 15/250.001; 15/250.12; 15/250.17
(58) Field of Classification Search ......... 318/443–445, 318/280–282; 15/250.001, 250.12, 250.17
See application file for complete search history.

(56) References Cited

U.S. PATENT DOCUMENTS

| | | | |
|---|---|---|---|
| 2,721,352 A | | 10/1955 | Oishei |
| 4,479,063 A | * | 10/1984 | Ueda et al. ............... 290/30 R |
| 4,520,271 A | | 5/1985 | Goertler et al. |
| 5,119,002 A | * | 6/1992 | Kato et al. .................. 318/444 |
| 5,140,234 A | * | 8/1992 | Wallrafen .................... 318/264 |
| 5,672,946 A | * | 9/1997 | Kawashima et al. ........ 318/444 |
| 6,275,231 B1 | | 8/2001 | Obradovich |
| 6,936,985 B2 | * | 8/2005 | Pankey et al. ............... 318/443 |
| 7,043,699 B2 | | 5/2006 | Obradovich |
| 7,095,199 B2 | * | 8/2006 | Hirose et al. ................ 318/444 |
| 7,423,399 B2 | * | 9/2008 | Pawlicki et al. ............. 318/443 |
| 2003/0173923 A1 | | 9/2003 | Nazione, Jr. et al. |
| 2007/0241612 A1 | * | 10/2007 | Jacoby ....................... 307/9.1 |

* cited by examiner

*Primary Examiner*—Bentsu Ro
*Assistant Examiner*—Thai Dinh
(74) *Attorney, Agent, or Firm*—David B. Kelley; Brooks Kushman P.C.

(57) ABSTRACT

A windshield wiper system for use on a hybrid electric vehicle is capable of adjusting the delay between consecutive cycles based on engine state and vehicle speed. The system includes a windshield wiper and a motor coupled to the windshield wiper. A sensor generates an engine speed signal and another sensor generates a vehicle speed signal. A processor in communication with the sensors and wiper motor provides a drive signal to the wiper motor which is based on the engine and vehicle speed.

19 Claims, 2 Drawing Sheets

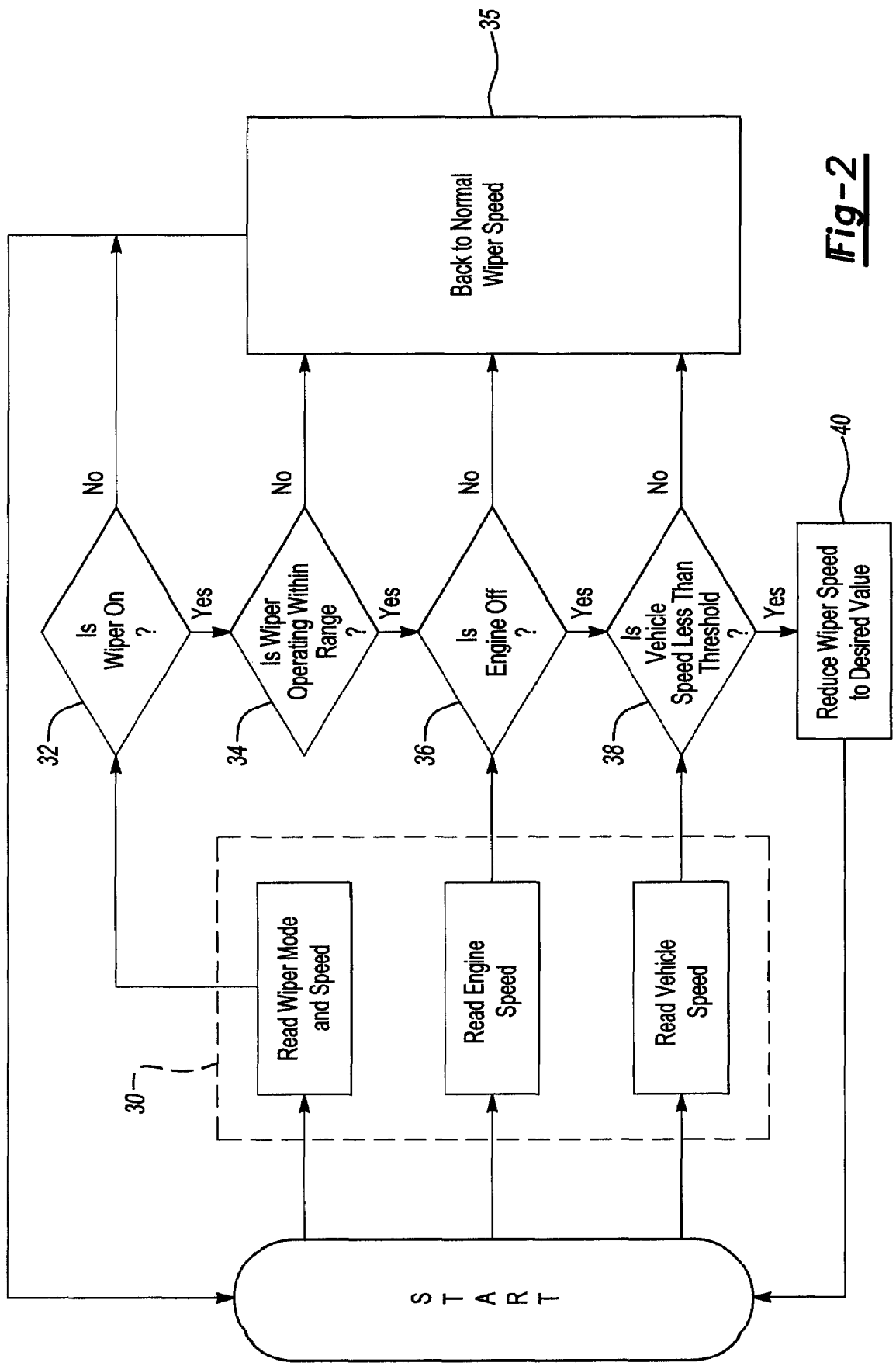

SYSTEM AND METHOD FOR CONTROLLING A WINDOW WIPER SYSTEM

BACKGROUND OF THE INVENTION

1. Field of the Invention

The invention relates to systems and methods for controlling window wiper systems.

2. Discussion

Windshield wiper operation may include several modes. For example, if a vehicle is operated in a light rain, drizzle, or light snow fall, the vehicle operator may set the selector mechanism or switch to a low setting to keep the windshield clean. As weather conditions change, the operator may select a high setting.

Vehicles may have an intermittent wiper mode that includes delays between successive sweeps based on calibrated values. This operation is in addition to the standard low and high modes. The intermittent wiper mode adds pre-determined delays between consecutive sweeps. The different delays are manually selected and include several settings. For example, during low speed operation with light rain, the intermittent system can be set for relatively long delays. As rainfall increases, the vehicle operator can adjust the intermittent mode to reduce the delay.

For conventional vehicles, during engine operation, noise from different sources may be masked by engine noise. Wiper operation may be one such source.

Conventional noise, vibration, and harshness (NVH) strategies may control the vehicle NVH level such that it is acceptable to occupants.

SUMMARY

Embodiments of the invention may take the form of a system for controlling a window wiper system for a hybrid electric vehicle. The system includes an engine and at least one controller. The controller determines an operating frequency of the window wiper system, an on/off state of the engine, and whether the operating frequency of the window wiper system falls within a predetermined range. The controller reduces the operating frequency of the window wiper system if it falls within the predetermined range.

Embodiments of the invention may take the form of a method for controlling a window wiper system for a hybrid electric vehicle. The method includes determining an operating frequency of the window wiper system, determining an on/off state of an engine, and determining if the operating frequency of the window wiper system falls within a predetermined range. The method also includes reducing the operating frequency of the window wiper system if it falls within the predetermined range.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2 is a flow chart of a method for controlling a wiper system of a hybrid electric vehicle in accordance with an embodiment of the invention.

DETAILED DESCRIPTION

Figure 1:
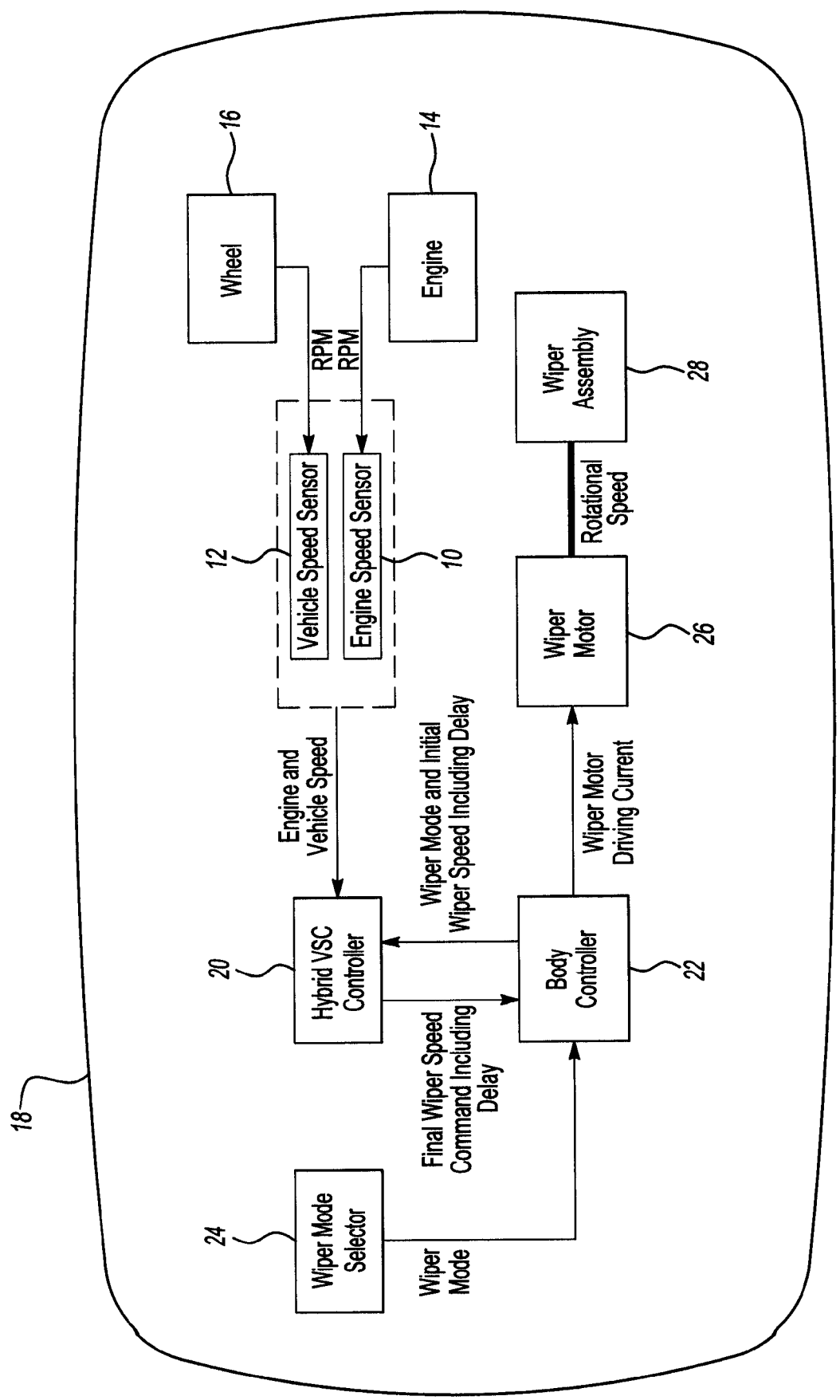
FIG. 1 is a block diagram of a system for controlling a wiper system of a hybrid electric vehicle in accordance with an embodiment of the invention and shows a body controller in communication with the wiper system, a hybrid vehicle systems controller, and a wiper mode selector.

Controlling NVH in hybrid electric vehicles (HEVs) may be different than in conventional vehicles due to HEV configuration and operational differences. For example, audible noise disturbances in HEVs may be different from conventional vehicles due to the hybridization and differing driveline dynamics. Also, HEV engine start/stop during vehicle operation may make certain disturbances, that would otherwise be masked in conventional vehicles, apparent. For example, a window wiper system operating intermittently in a conventional vehicle may have any NVH associated with its operation masked by the engine. In an HEV, however, NVH associated with a window wiper system operating intermittently may be apparent to an occupant if the engine is off.

It may be desirable to have an adjustable frequency of the wiper operation during the hybrid powertrain modes based on, for example, the engine state and/or vehicle speed. Using these signals, the operation of the wiper system may be modified, for example, to reduce NVH. Because the hybrid powertrain increases fuel economy, the adjustable frequency of the wiper operation during hybrid modes supports the goal of increasing fuel economy.

Some embodiments of the invention may provide a windshield wiper system for use on an HEV that is capable of automatically adjusting the frequency of the windshield wiper based on engine state and vehicle speed. The system includes a windshield wiper and a motor coupled thereto for driving the windshield wiper. A sensor generates a signal corresponding to a measure of the engine speed. Another sensor generates a signal corresponding to a measure of vehicle speed. A processor is coupled to the sensors and to the wiper motor and provides a drive signal to the wiper motor which is a function of the engine speed signal and vehicle speed signal.

Some embodiments of the invention provide an engine controller with hybrid vehicle system controls, a body controller, two propulsion sources, e.g., an engine and an electric motor, a wiper mode selector, a wiper motor, and a wiper assembly. The vehicle system controls are functions of the supervisory controls that coordinate the interaction between the different subsystems in a hybrid vehicle to provide seamless propulsion torque and vehicle functionality. The vehicle system controls determines the operation mode of the hybrid powertrain.

There may be many modes of a hybrid vehicle including electric mode and engine-on mode. The electric mode includes active propulsion by the electric motor while the engine is off. The engine-on mode includes parallel or series operation of the hybrid powertrain with the engine on.

Some embodiments of the invention provide an algorithm for modifying wiper speed and may be implemented as part of the vehicle system controls within the engine controller. The information that may be needed for the algorithm includes the engine speed and the vehicle speed.

An engine speed will be provided by a sensor on the engine crankshaft or by a sensor on the hybrid transmission input shaft and determined within the engine controller. Together with the determined electric mode, the hybrid vehicle engine off state can be determined and provided as an input to the algorithm. The vehicle speed will then be determined using sensors attached to the wheels or by a sensor on the hybrid transmission output shaft. This information will be provided to the engine controller directly or from the ABS controller and used as an input to the algorithm.

Other information that may be needed by the algorithm will be communicated by the body controller. The body controller includes algorithms to determine the wiper speed based on the wiper manual mode selector and preset values ranging from operating modes of, for example, high, low, and multiple intermittent levels. Using this information, the body controller sends out the control signal to the wiper electric motor to drive it to spin. The wiper electric motor is mechanically attached to the wiper assembly such that the wiper assembly sweeps the windshield clean with the determined speed.

In some embodiments, the body controller may provide the initial determined wiper speed to the engine controller for the vehicle system controls as an input to the algorithm. First the algorithm will determine whether the initial determined wiper speed is within the desired range of operation where modification is permitted. If the initial determined wiper speed falls within the range, the algorithm will then determine whether the hybrid vehicle engine state is off. Once the vehicle system controller has determined that it is in hybrid vehicle engine off state, the next step is to determine whether the vehicle speed is within the desired range. The desired range can be a fixed range, e.g., less than 20 m.p.h., or a desired range pre-selected by the driver. If the vehicle speed falls within the desired range of operation, the algorithm determines that the wiper speed can be reduced to the preset value. Again, this preset value can be a fixed value or a value selected by the driver as part of vehicle configuration. The amount of wiper speed reduction can be aligned to the next lower level wiper speed value or based on a percent of the current level wiper speed. Using this, the algorithm in the vehicle system controls sends the final determined wiper speed to the body controller which then controls the wiper motor and the wiper assembly based on this final determined wiper speed.

The operation of this hybrid NVH mode may be desired since the condition described permits attenuation of the wiper moving activity by the algorithm when the engine is stationary and not producing any noise or vibration. In this mode of vehicle operation, the driver may perceive NVH issues.

If any of the above conditions become false, the wiper speed is reset to the initial determined wiper speed before the algorithm made any changes.

FIG. 1 is a block diagram of a wiper control system of a hybrid electric vehicle. Engine speed sensor 10 and vehicle speed sensor 12 read the respective speeds of engine 14 and wheel 16 of vehicle 18. Sensors 10, 12 communicate engine and vehicle speed information to hybrid vehicle system controller 20.

Body controller 22 receives a selected wiper system activating mode, e.g., slow, fast, intermittent, etc., from wiper mode selector 24. Wiper mode selector 24 includes, for example, a dial that permits a user to select the desired activating mode and a threshold speed of the vehicle. Body controller 22 translates the activating mode into an activating speed including delay and communicates the activating mode and activating speed information to hybrid vehicle system controller 20.

Based on the engine speed, vehicle speed, activating mode, and activating speed, hybrid vehicle system controller 20 issues an activating speed command including delay to body controller 22. Body controller 22, based on the activating speed command, drives wiper motor current to wiper motor 26. Wiper motor 26, in turn, supplies rotational speed to wiper assembly 28.

FIG. 2 is a flow chart of control logic of a wiper system of a hybrid electric vehicle. At 30, wiper mode, wiper speed, engine speed, and vehicle speed are read. At 32, it is determined whether the wiper system is on. If yes, at 34, it is determined whether the wiper system is operating with a period, e.g., intermittent period, 1 sec., likely, for example, to result in noise, vibration, and harshness, e.g., 1.5 rev./sec. If no, wiper speed is unchanged. If yes, at 36, it is determined whether the engine is off. If no, wiper speed is unchanged. If yes, at 38, it is determined whether vehicle speed is less than the threshold speed, e.g., 15 m.p.h., at which, for example, noise, vibration, and harshness from a wiper system operating with an intermittent period would be evident if the engine is off. If no, wiper speed is unchanged. If yes, at 40, wiper speed is reduced by (to), for example, a desired amount, e.g., 0.5 rev./sec., thus the wiper period is increasing. The logic then loops back to START.

In a subsequent iteration of the above logic, if wiper speed was reduced in a previous iteration and the outcome of any of steps 34, 36, 38 in a current iteration was no, at 35, the wiper speed would be returned to its value prior to any reduction. For example, if the wiper system were operating with a period of 1 sec. prior to the speed being reduced, and is now operating with a period of 1.5 sec. after step 40, in a subsequent iteration of the logic where the outcome of any of steps 34, 36, 38 were no, at 35, the period of the wiper system would be returned to 1 sec.

In a subsequent iteration of the above logic, if wiper speed was reduced in a previous iteration and the outcome of all of steps 34, 36, 38 in a current iteration was yes, at 40, the wiper speed would be unchanged. For example, if the wiper system were operating with a period of 1 sec. prior to the speed being reduced, and is now operating with a period of 1.5 sec. after step 40, in a subsequent iteration of the logic where the outcome of all of steps 34, 36, 38 were yes, at 40, the period of the wiper system would remain 1.5 sec.

In alternative embodiments, some or all of the steps of the method of FIG. 2 shown in parallel may be completed in series. For example, the steps of reading engine speed and vehicle speed may be performed sequentially, in any order. Likewise, some or all of the steps of the method of FIG. 2 shown in series may be completed in parallel.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling a window wiper system for a hybrid electric vehicle comprising:
    an engine; and
    at least one controller configured to
        determine an operating frequency of the window wiper system,
        determine an on/off state of the engine;
        determine if the operating frequency of the window wiper system falls within a predetermined range of operating frequencies if the engine is off, and
        reduce the operating frequency of the window wiper system if the operating frequency of the window wiper system falls within the predetermined range of operating frequencies thereby reducing at least one of noise, vibration, and harshness associated with the operating frequency of the window wiper system.

2. The system of claim 1 wherein the operating frequency is reduced by a predetermined amount.

3. The system of claim 1 further comprising a vehicle speed sensor wherein the at least one controller is further configured to monitor vehicle speed.

4. The system of claim 3 wherein the at least one controller is further configured to determine if the vehicle speed falls within a predetermined speed range.

5. The system of claim 4 wherein the predetermined speed range is user selected.

6. The system of claim 4 wherein the operating frequency of the window wiper system is reduced if the operating frequency of the window wiper system falls within the predetermined range of operating frequencies and the vehicle speed falls within the predetermined speed range.

7. The system of claim 1 wherein the at least one controller is further configured to determine an on/off state of the window wiper system.

8. The system of claim 7 wherein the at least one controller determines the operating frequency of the window wiper system if the window wiper system is on.

9. The method of claim 1 further comprising determining an on/off state of the window wiper system.

10. The method of claim 9 wherein the operating frequency of the window wiper system is determined if the window wiper system is on.

11. A method for controlling a window wiper system for a hybrid electric vehicle having an engine comprising:
    determining an operating frequency of the window wiper system;
    determining an on/off state of the engine;
    determining if the operating frequency of the window wiper system falls within a predetermined range of operating frequencies if the engine is off; and
    reducing the operating frequency of the window wiper system if the operating frequency of the window wiper system falls within the predetermined range of operating frequencies thereby reducing at least one of noise, vibration, and harshness associated with the operating frequency of the window wiper system.

12. The method of claim 11 wherein the operating frequency is reduced by a predetermined amount.

13. The method of claim 11 further comprising monitoring vehicle speed.

14. The method of claim 13 further comprising determining if the vehicle speed falls within a predetermined speed range.

15. The method of claim 14 wherein the predetermined speed range is user selected.

16. The method of claim 14 wherein the operating frequency of the window wiper system is reduced if the operating frequency of the window wiper system falls within the predetermined range of operating frequencies and the vehicle speed falls within the predetermined speed range.

17. A method for controlling a window wiper system for a hybrid electric vehicle having an engine comprising:
    determining an on/off state of the window wiper system;
    determining an operating frequency of the window wiper system if the window wiper system is on;
    determining an on/off state of the engine;
    determining if the operating frequency of the window wiper system falls within a predetermined range of operating frequencies if the engine is off;
    monitoring vehicle speed;
    determining if the vehicle speed falls within a predetermined speed range; and
    reducing the operating frequency of the window wiper system if the operating frequency of the window wiper system falls within the predetermined range of operating frequencies and the vehicle speed falls within the predetermined speed range thereby reducing at least one of noise, vibration, and harshness associated with the operating frequency of the window wiper system.

18. The method of claim 17 wherein the operating frequency is reduced by a predetermined amount.

19. The method of claim 17 wherein the predetermined speed range is user selected.

* * * * *